Aug. 21, 1956
A. M. LEVINE
2,759,997
GENERATION OF HARMONICS FROM HIGH FREQUENCY COMPONENTS OF RECEIVED SIGNAL FOR ADDITION TO RECEIVED SIGNAL
Filed Dec. 14, 1951

INVENTOR
ARNOLD M. LEVINE
BY [signature]
ATTORNEY

United States Patent Office 2,759,997

Patented Aug. 21, 1956

2,759,997

GENERATION OF HARMONICS FROM HIGH FREQUENCY COMPONENTS OF RECEIVED SIGNAL FOR ADDITION TO RECEIVED SIGNAL

Arnold M. Levine, River Edge, N. J., assignor to International Telephone and Telegraph Corporation, a corporation of Maryland Application December 14, 1951, Serial No. 261,690

4 Claims. (Cl. 178—7.3)

This invention relates to television receivers and more particularly to means for increasing the apparent definition of a received television picture.

The amount of information transmitted by a television transmitter is proportional to the frequency band width of the transmitted signal. Under present regulations governing the frequency band width of television transmissions, the information transmitted is limited to a frequency spectrum of 4 m.c. Thus if the waveform of the information to be transmitted consists of a sinusoidal fundamental in the 2 to 4 m.c. range and harmonics of the fundamental, the harmonics will be of a frequency outside the limits of the permissible television spectrum, and hence this information will be lost, resulting in a decrease in definition of the received picture.

One of the objects of this invention, therefore, is to increase the apparent definition of a received television picture without transmitting additional information than is contained in the present television frequency band width.

Another object is to provide a television picture having a greater apparent definition from the transmitted information and information assumed and added at the television receiver.

A further object is to develop and impart harmonic information which normally lies outside the frequency band width of a television transmission to the cathode ray tube of a television receiver.

Briefly, in this invention it is assumed that there is information extending beyond the 4 m.c. bandwidth which is transmitted but which is harmonically related to the fundamental components of the transmitted signals that extend from 2 to 4 m.c. These harmonic signals are normally lost because of the limited frequency bandwidth of the transmitted signal and the limited frequency response of the video amplifier. In this invention the 2 to 4 m.c. signals are properly filtered out and the sinusoidal fundamental components in this frequency range are separated from the harmonics of the fundamental signals in the 0–2 m.c. range and these fundamental signals are distorted to produce the harmonic components which are assumed to exist in the frequency range above the transmitted 4 megacycles. These harmonics above the transmitted 4 m.c. frequency range are then added to the original signal information in the transmitted frequency bandwidth to cause a more rapid change in the wave front of the fundamental signals in the 2 to 4 m.c. frequency range.

The above-mentioned and other features and objects of this invention and the manner of attaining them will become more apparent by reference to the following description taken in conjunction with the accompanying drawings, wherein.

Figure 1:
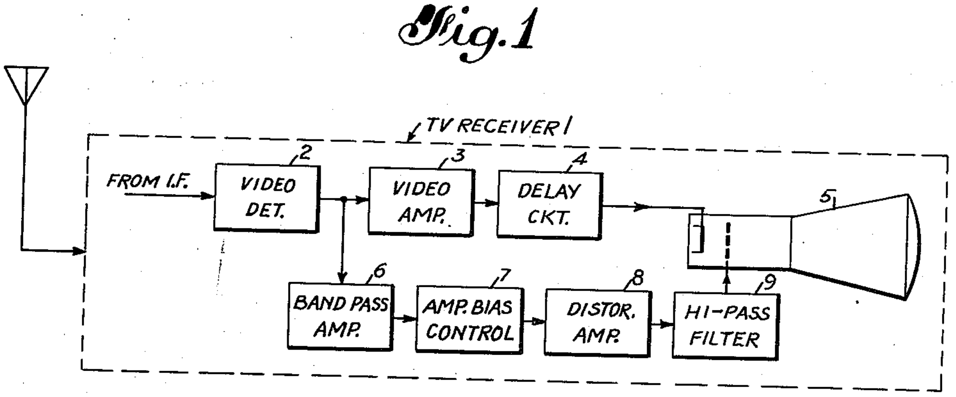
Fig. 1 shows in block schematic form an embodiment of this invention for use in a television receiver.

Referring to Fig. 1 of the drawing, a television receiver employing an embodiment of this invention is shown wherein the transmitted signal having a frequency bandwidth of 4 megacycles is received by a television receiver 1 and propagated through the usual front end circuitry which for purposes of clarity is not shown in the drawing. The 4 m.c. signal from the video I. F. amplifier is fed to the video detector 2. The output from the video detector 2 having a 4 mc. bandwidth is fed to a video amplifier 3 then through delay circuit 4 to the cathode ray tube 5 of the television receiver. Thus the total video signal having a 4 mc. bandwidth is coupled through the delay circuit 4 to the cathode ray tube 5. A band pass amplifier 6 couples the 2 to 4 mc. components of the detected video signal. As will be readily understood by those skilled in the art, impedance matching networks are not shown, but may be utilized in accordance with good engineering practice since the signals in the 2–4 mc. range are passed through the amplifier 6 and also through the amplifier 3 and thus the design of the amplifiers 6 and 3 can be considered to include such impedance matching networks. An amplitude bias control 7 passes signals in the 2 to 4 mc. range which are fundamentals and substantially eliminates the harmonics of the 0 to 2 mc. signals which fall in the 2 to 4 mc. range. A distortion network 8 develops harmonics of those signals passed by the amplitude bias control 7. A high pass filter 9 passes the output of the distortion network 8 that lies in the 4 to 8 mc. region. The output of the high pass filter 9 is fed to the grid of the cathode ray tube 5 where it is combined with the received detected signal which is delayed, an amount of time equal to the time of propagation of the 2 to 4 mc. signals from the band pass amplifier 6 to the grid of the cathode ray tube 5, by delay circuit 4 and thus causes a more rapid change in the wave front of the signals in the 2 to 4 mc. frequency range providing greater definition to the viewed picture appearing on the face of the cathode ray tube 5.

Figure 2:
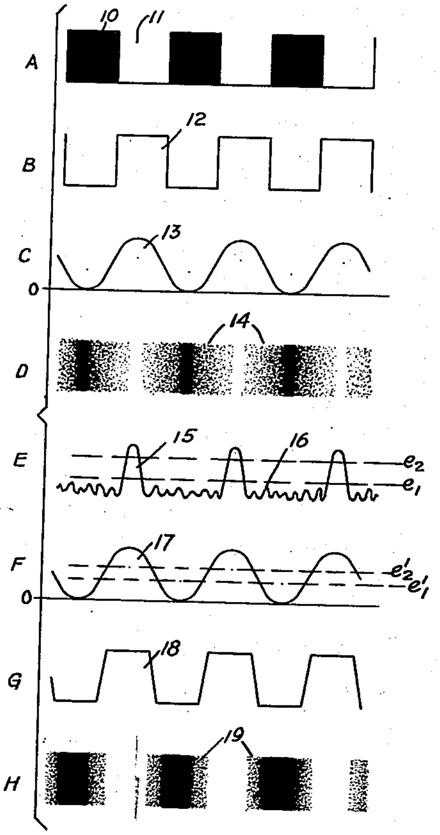
Fig. 2 shows various curves helpful in explanation of this invention.

Referring to Fig. 2, assume a checkerboard design of alternate black and white squares 10 and 11, curve A, is scanned by the television camera. The signal produced will consist of a square waveform 12, curve B. The square wave of curve B is made up of a sinusoidal fundamental and harmonics of this fundamental. If the fundamental frequency is greater than 2 mc., any harmonics of the fundamental will be greater than 4 mc. and, therefore, will not be transmitted since the transmitted signal must be limited to a band width of 4 mc.; thus, the transmitted signal of the square wave 12 will be a sinusoidal wave 13, curve C. If the sinusoidal waveform of curve C is applied to the cathode ray tube, the original sharply-defined checkerboard pattern will be blurred at 14, curve D. However, by this invention the 2 to 4 mc. component of the output signal from video detector 2 is also passed by the band pass filter 6 to the amplitude bias control 7, as shown in Fig. 1. The 2 to 4 mc. signal passed by the band pass amplifier 6 consists of the fundamentals 15 of the signals in the 2 to 4 mc. range plus harmonics 16 of the signals in the 0 to 2 mc. range, as shown in curve E. An amplitude bias control 7 eliminates all waveforms below a predetermined amplitude $e_1$. It is assumed that the harmonics of the signals in the 0 to 2 mc. range will be of smaller amplitude than the fundamentals in the 2 to 4 mc. range and thus will be eliminated by biasing the amplitude bias control 7 at a voltage $e_1$. The output of the amplitude bias control 7 is the sinusoidal fundamental in the 2 to 4 mc. range as shown in curve F. The sinusoidal fundamental is then distorted or clipped at a voltage level $e_2$ thus producing an output wave 18, curve G, which closely approximates the original signal wave 12, curve B. This distorted signal is filtered and the 4 to 8 mc. components are passed through the high pass filter 9 and fed to the grid of the cathode ray tube 5 where they are mixed with the original signal which has been delayed in time by delay circuit 4. The resultant picture on the face of the cathode ray tube 5 will be more sharply defined, as shown at 19, curve H, than was heretofore obtainable with the aforementioned bandwidth restrictions.

Figure 3:
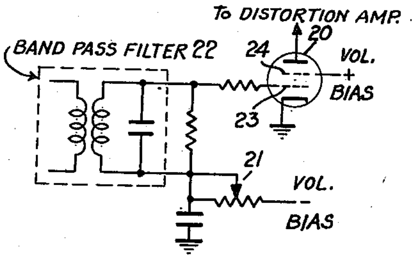
Fig. 3 is a schematic illustration of an amplitude bias control employed in this invention.

Referring to Fig. 3, the amplitude bias control 7 is shown comprising an electron discharge device 20 having a plurality of electrodes and a variable resistor 21. The output of the band pass filter 22 is applied to the control grid 23 of the vacuum tube 20. Any fundamental in the 2 to 4 mc. frequency range passed by band pass filter 12 will have a greater amplitude than the harmonics in the 2 to 4 mc. frequency range of fundamental in the 0 to 2 mc. range. A negative voltage bias prevents waveforms having an amplitude less than the negative bias from being fed to the grid of the vacuum tube 20. The variable resistor 21 permits the adjustment of the negative voltage bias level. A screen grid 24 has a positive bias applied to it to clip the tops of the sine wave fundamentals passed by the control grid 23. Thus the output of the vacuum tube 20 is substantially a square waveform which is obtained by distorting the sinusoidal fundamental components in the 2 to 4 mc. range of the detected video signal.

While I have described above the principles of my invention in connection with specific apparatus, it is to be clearly understood that this description is made by way of example only and not as a limitation to the scope of my invention as set forth in the objects thereof and in the accompanying claims.

I claim:

1. In a television receiver having means to detect the video signal; means to increase the apparent definition of the received picture comprising means to isolate the high frequency components of the detected signal, means to isolate the sinusoidal fundamentals of the said high frequency components, means to produce harmonic components of said sinusoidal fundamentals, means to amplify said harmonic components, means to isolate said amplified harmonic components, means to delay said detected video signal and means to combine the said delayed detected video signal and the said amplified isolated harmonic components.

2. In a television receiver having means to detect the video signal; means to increase the apparent definition of the received picture, comprising means to isolate the high frequency components of the detected video signal, an electron discharge device having a plurality of electrodes including a cathode, anode, control grid and screen grid, means to couple the isolated high frequency components of the detected video signal to the control grid of said electron discharge device, a source of adjustable negative potential, means to couple said source of adjustable negative potential to said control grid to vary the bias thereon to cause said discharge device to pass only those isolated high frequency components of the detected video signal which are fundamental components, a source of positive potential, means to couple said source of positive potential to the screen grid of said electron discharge device, means to harmonically distort the output of said discharge device, means to isolate the harmonic frequency content of the output of said distortion means, means to delay said detected video signal and means to combine said delayed detected video signal and said isolated harmonic frequency content to couple source of negative potential to said control grid further includes means to adjust the voltage of said source of negative potential.

3. In a television receiver having means to detect a video signal having a frequency bandwidth extending from a lower frequency limit $f_0$ to an upper frequency limit $f_2$, means to increase the apparent definition of the received picture comprising means to isolate the high frequency components extending from a frequency $f_1$ midway between $f_0$ and $f_2$, to the upper frequency $f_2$ of the detected video signal having the frequency bandwidth of $f_0$ to $f_2$, means to isolate the sinusoidal fundamentals from the harmonic signal components in said isolated high frequency components extending from frequency $f_1$ to $f_2$, means to produce harmonic components in a frequency range extending from $f_2$ to $2(f_2)$ of said sinusoidal fundamental in the frequency range $f_1$ to $f_2$, means to amplify said harmonic components having a frequency range of $f_2$ to $2(f_2)$, means to isolate said amplified harmonic components, means to delay said detected video signal and means to combine said delayed detected video signal having a frequency range of $f_0$ to $f_2$ and said amplified isolated harmonic components having a frequency range of $f_2$ to $2(f_2)$.

4. In a television receiver having means to detect a video signal having a frequency bandwidth of 0–4 megacycles; means to increase the apparent definition of the received picture comprising means to isolate the high frequency components in the 2–4 mc. range of the detected video signal, means to isolate the sinusoidal fundamentals occurring in the high frequency range of 2–4 megacycles, means to produce harmonic components in the 4–8 mc. range of the sinusoidal fundamental occurring in the 2–4 mc. range, means to amplify the 4–8 mc. harmonic components, means to isolate the amplified harmonic components in the 4–8 mc. range, means to delay the detected video signal in the 0–4 mc. range and means to combine the delayed detected video signal in the 0–4 mc. range and the amplified isolated harmonic components in the 4–8 mc. range.

References Cited in the file of this patent

UNITED STATES PATENTS

| | | |
|---|---|---|
| 2,182,326 | Urtel | Dec. 5, 1939 |
| 2,243,599 | Herbst | May 27, 1941 |
| 2,323,626 | Sheffield | July 6, 1943 |